United States Patent
Mahadik et al.

(10) Patent No.: US 8,955,138 B1
(45) Date of Patent: Feb. 10, 2015

(54) SYSTEMS AND METHODS FOR REEVALUATING APPARENTLY BENIGN BEHAVIOR ON COMPUTING DEVICES

(71) Applicant: Symantec Corporation, Mountain View, CA (US)

(72) Inventors: Atif Mahadik, Fremont, CA (US); Shreyans Mehta, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 27 days.

(21) Appl. No.: 13/939,600

(22) Filed: Jul. 11, 2013

(51) Int. Cl.
  *H04L 29/06* (2006.01)
  *G06F 21/55* (2013.01)

(52) U.S. Cl.
  CPC ........................ *G06F 21/55* (2013.01)
  USPC ................. 726/24; 726/22; 726/23

(58) Field of Classification Search
  USPC ....................... 726/22–24; 713/188
  See application file for complete search history.

(56) References Cited

U.S. PATENT DOCUMENTS

| | | | | |
|---|---|---|---|---|
| 4,856,735 | A * | 8/1989 | Lotz et al. | 244/35 R |
| 7,093,239 | B1 * | 8/2006 | van der Made | 717/135 |
| 7,185,232 | B1 * | 2/2007 | Leavy et al. | 714/41 |
| 7,222,126 | B2 * | 5/2007 | Wolman | 707/756 |
| 7,287,278 | B2 * | 10/2007 | Liang | 726/22 |
| 7,386,888 | B2 * | 6/2008 | Liang et al. | 726/23 |
| 7,512,808 | B2 * | 3/2009 | Liang | 713/188 |
| 7,523,493 | B2 * | 4/2009 | Liang et al. | 726/13 |
| 7,530,105 | B2 * | 5/2009 | Gilbert et al. | 726/22 |
| 7,565,550 | B2 * | 7/2009 | Liang et al. | 713/188 |
| 7,620,851 | B1 * | 11/2009 | Leavy et al. | 714/41 |
| 7,694,150 | B1 * | 4/2010 | Kirby | 713/188 |
| 7,735,136 | B2 * | 6/2010 | Mantripragada et al. | 726/22 |
| 7,854,004 | B2 * | 12/2010 | van der Made | 726/23 |
| 7,885,966 | B2 * | 2/2011 | Wolman | 707/756 |
| 8,055,677 | B2 * | 11/2011 | Wolman | 707/776 |
| 8,091,132 | B2 * | 1/2012 | Ansari et al. | 726/23 |
| 8,108,929 | B2 * | 1/2012 | Agrawal et al. | 726/23 |
| 8,159,948 | B2 * | 4/2012 | Wakumoto | 370/233 |
| 8,291,498 | B1 * | 10/2012 | Liang et al. | 726/24 |
| 8,412,723 | B2 * | 4/2013 | Wolman | 707/756 |
| 8,494,979 | B2 * | 7/2013 | Baum-Waidner | 706/12 |
| 8,516,575 | B2 * | 8/2013 | Burnside et al. | 726/22 |
| 8,516,590 | B1 * | 8/2013 | Ranadive et al. | 726/24 |
| 8,555,391 | B1 * | 10/2013 | Demir et al. | 726/24 |
| 8,631,489 | B2 * | 1/2014 | Antonakakis et al. | 726/22 |
| 8,683,584 | B1 * | 3/2014 | Daswani et al. | 726/22 |
| 8,793,790 | B2 * | 7/2014 | Khurana et al. | 726/22 |
| 8,800,036 | B2 * | 8/2014 | Khayam et al. | 726/23 |

* cited by examiner

*Primary Examiner* — Haresh N Patel
(74) *Attorney, Agent, or Firm* — ALG Intellectual Property, LLC

(57) ABSTRACT

A computer-implemented method for reevaluating apparently benign behavior on computing devices may include (1) receiving a plurality of reports from a plurality of computing systems that indicate that an attack that targeted each of the systems reached a specific stage on each system, (2) identifying behavioral data that includes, for each computing system within the plurality, a plurality of activities that the computing system observed before the attack reached the specific stage on the computing system, wherein the plurality of activities are of a type of activity that is relevant to detecting a prior stage of the attack, (3) analyzing the behavioral data to correlate the attack with at least one activity observed before the attack reached the specific stage, and (4) determining that the activity is suspect based at least in part on correlating the attack with the activity. Various other methods, systems, and computer-readable media are also disclosed.

20 Claims, 7 Drawing Sheets

SYSTEMS AND METHODS FOR REEVALUATING APPARENTLY BENIGN BEHAVIOR ON COMPUTING DEVICES

BACKGROUND

Viruses, Trojans, spyware, and other kinds of malware are a constant threat to any computing device which requires network connectivity. Many different types of security systems exist to combat these threats, ranging from browser plug-ins to virus scanners to firewalls and beyond. Countless new instances and permutations of malware are created every day, requiring security systems to be constantly updated. Despite this vigilance, computing devices continue to be infected by threats of all types. An attack may bypass several layers of security systems before being detected, and may do so on many computing devices simultaneously.

Traditional systems for securing computing devices against malware may need to be manually updated with signatures and/or heuristics in order to detect new attacks. Traditional security systems which fail to detect an instance of an attack may continue to fail to detect the same attack in the future. Some traditional security systems may also fail to identify that an attack which infected the computing device did so by bypassing the security system. Accordingly, the instant disclosure identifies and addresses a need for additional and improved systems and methods for reevaluating apparently benign behavior on computing devices.

SUMMARY

As will be described in greater detail below, the instant disclosure generally relates to systems and methods for reevaluating apparently benign behavior on computing devices by gathering activity from multiple infected computing devices in order to identify an activity that may have occurred on each infected device prior to the attack being detected on that device, and determining that the activity may be suspicious based on correlating the activity with the attack.

In one example, a computer-implemented method for reevaluating apparently benign behavior on computing devices may include (1) receiving a plurality of reports from a plurality of computing systems that indicate that an attack that targeted each of the plurality of computing systems reached a specific stage on each of the plurality of computing systems, (2) identifying behavioral data that includes, for each computing system within the plurality of computing systems, a plurality of activities that the computing system observed before the attack reached the specific stage on the computing system (where the plurality of activities are of a type of activity that is relevant to detecting a prior stage of the attack that precedes the specific stage of the attack), (3) analyzing the behavioral data to correlate the attack with at least one activity observed before the attack reached the specific stage on at least one of the plurality of computing systems, and (4) determining that the activity is suspect based at least in part on correlating the attack with the activity.

In one embodiment, a security system on at least one targeted computing system within the plurality of computing systems may have observed the activity but failed to detect the attack at the prior stage and an additional security system on the targeted computing system may have detected the attack at the specific stage.

In some examples, the plurality of activities may include activities previously determined to be benign.

The specific stage and prior stage of the attack may occur in a number of different combinations. In one example, the specific stage of the attack may include the attack causing network activity. In some examples, the prior stage of the attack may include the attack injecting a known legitimate process with a malicious process, the attack downloading a malicious file, a browser exploit, and/or a client system accessing a malicious Internet resource.

In some examples, the specific stage of the attack may include the attack injecting a known legitimate process with a malicious process. In one example, the prior stage of the attack may include the attack downloading a malicious file that includes the malicious process. Additionally or alternatively, the specific stage of the attack may include the attack downloading a malicious file. In one example, the prior stage of the attack may include a browser exploit. Additionally or alternatively, the specific stage of the attack may include a browser exploit. In one example, the prior stage of the attack may include a client system accessing a malicious Internet resource.

In some embodiments, information about the activity may be created or stored in order to combat the attack in the future. In some examples, the computer-implemented method may further include creating a signature based on the activity. The signature may be created in such a way that it can be used to detect the attack at the prior stage. In some examples, the computer-implemented method may further include sending information that can be used to recognize the prior stage of the attack to at least one additional computing system. In these examples, the information may include the signature.

In some embodiments, the activities that are collected and/or analyzed may be limited in some way to exclude irrelevant activities. In one embodiment, analyzing the behavioral data further may include filtering out known legitimate activity that is not connected to the attack from the plurality of activities. In some examples, identifying the plurality of activities may include identifying, for each computing system within the plurality of computing systems, activities that occurred on the computing system within a predetermined time span before the attack was detected on the computing system.

In one embodiment, a system for implementing the above-described method may include (1) a receiving module that receives a plurality of reports from a plurality of computing systems that indicate that an attack that targeted each of the plurality of computing systems reached a specific stage on each of the plurality of computing systems and (2) an identification module that identifies behavioral data that includes, for each computing system within the plurality of computing systems, a plurality of activities that the computing system observed before the attack reached the specific stage on the computing system. The plurality of activities may be of a type of activity that is relevant to detecting a prior stage of the attack that precedes the specific stage of the attack. The system for implementing the above-described method may also include (3) an analysis module that analyzes the behavioral data to correlate the attack with at least one activity observed before the attack reached the specific stage on at least one of the plurality of computing systems, (4) a determination module that determines that the activity is suspect based at least in part on correlating the attack with the activity, and (5) at least one processor configured to execute the receiving module, the identification module, the analysis module, and the determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive a plurality of reports from a plurality of computing systems that indicate that an attack that targeted each of the plurality of computing systems reached a specific stage on each of the plurality of computing systems, (2) identify behavioral data that includes, for each computing system within the plurality of computing systems, a plurality of activities that the computing system observed before the attack reached the specific stage on the computing system (where the plurality of activities are of a type of activity that is relevant to detecting a prior stage of the attack that precedes the specific stage of the attack), (3) analyze the behavioral data to correlate the attack with at least one activity observed before the attack reached the specific stage on at least one of the plurality of computing systems, and (4) determine that the activity is suspect based at least in part on correlating the attack with the activity.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
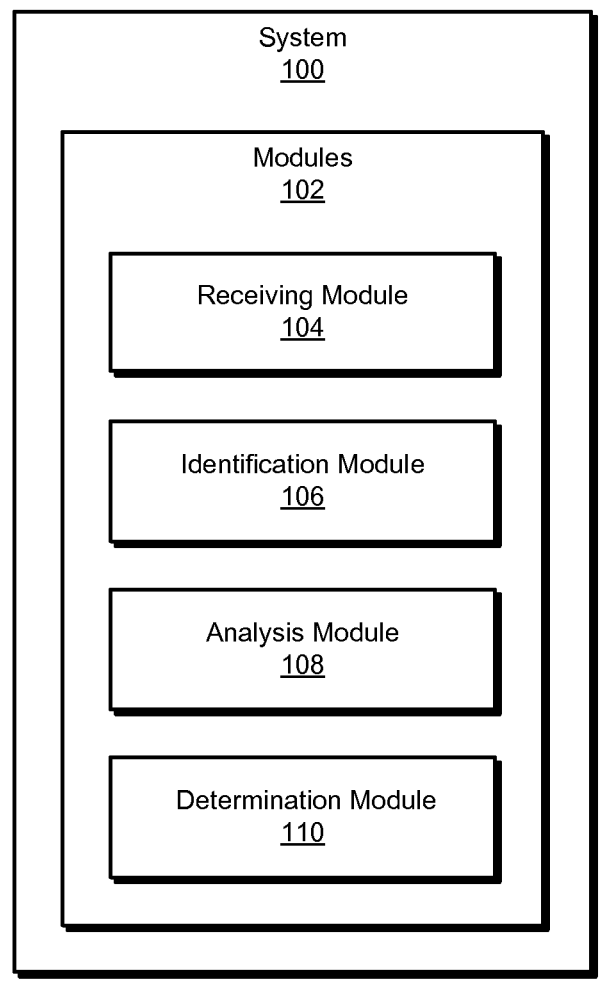
FIG. 1 is a block diagram of an exemplary system for reevaluating apparently benign behavior on computing devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for reevaluating apparently benign behavior on computing devices. As will be explained in greater detail below, reevaluating behavior previously deemed benign can allow security systems to combat new threats more quickly and accurately. Once later security systems have deemed the behavior a threat, earlier security systems may be updated to recognize the behavior and prevent the potential infection at an earlier stage of attack than the stage at which the threat was initially detected. Preventing the infection at an earlier stage may block malicious activity that may have been caused by the malware at the later stage, as well as improving security over all by increasing defense in depth.

Figure 2:
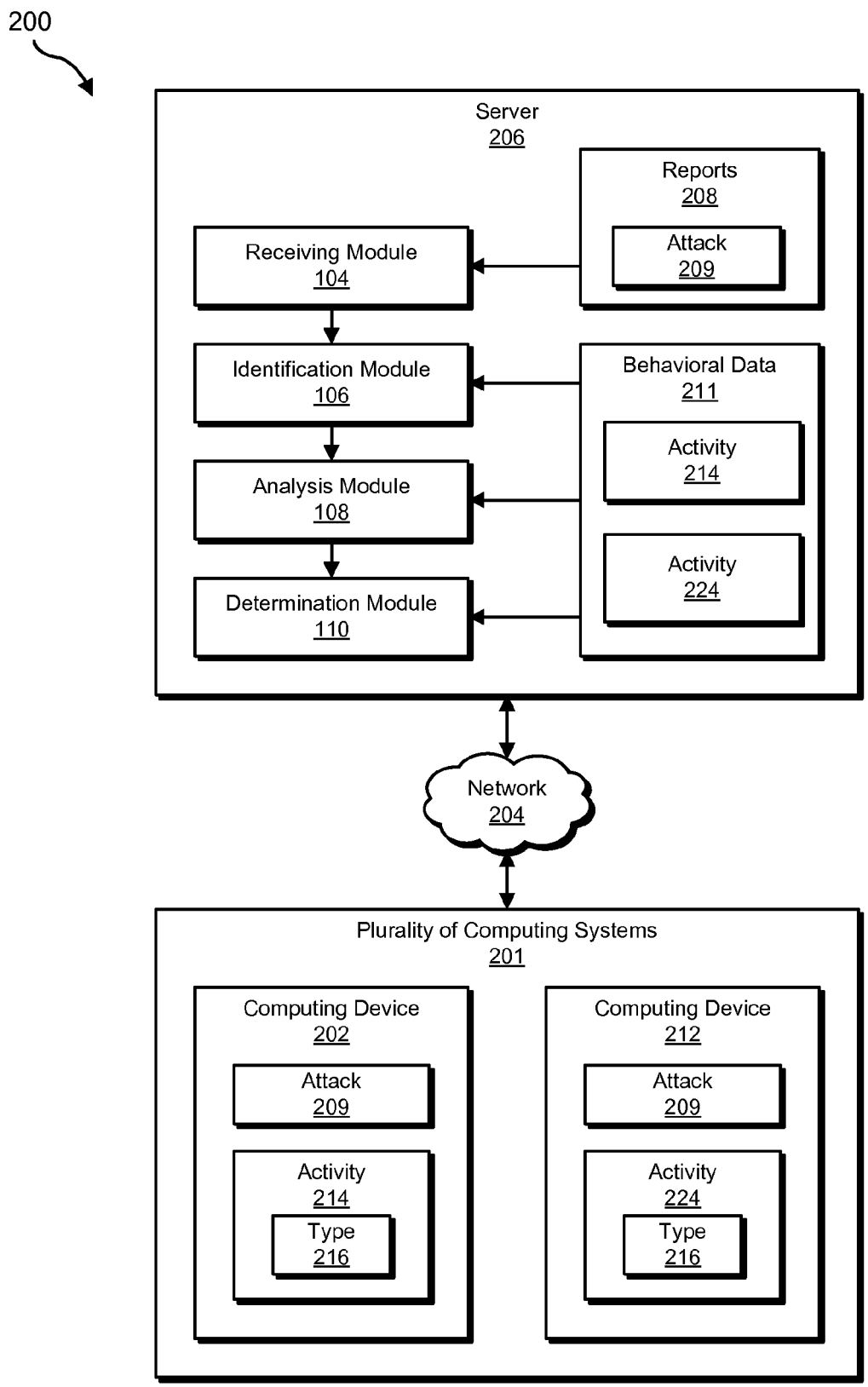
FIG. 2 is a block diagram of an exemplary system for reevaluating apparently benign behavior on computing devices.

The following will provide, with reference to FIGS. 1-2, detailed descriptions of exemplary systems for reevaluating apparently benign behavior on computing devices. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for reevaluating apparently benign behavior on computing devices. As illustrated in this figure, exemplary system 100 may include one or more modules 102 for performing one or more tasks. For example, and as will be explained in greater detail below, exemplary system 100 may include a receiving module 104 that may receive a plurality of reports from a plurality of computing systems that indicate that an attack that targeted each of the plurality of computing systems reached a specific stage on each of the plurality of computing systems. Exemplary system 100 may additionally include an identification module 106 that may identify behavioral data that includes, for each computing system within the plurality of computing systems, a plurality of activities that the computing system observed before the attack reached the specific stage on the computing system. The plurality of activities may be of a type of activity that may be relevant to detecting a prior stage of the attack that precedes the specific stage of the attack.

Exemplary system 100 may also include an analysis module 108 that may analyze the behavioral data to correlate the attack with at least one activity observed before the attack reached the specific stage on at least one of the plurality of computing systems. Exemplary system 100 may additionally include a determination module 110 that may determine that the activity may be suspect based at least in part on correlating the attack with the activity. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, computing device 212 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 and/or computing device 212 in communication with a server 206 via a network 204. Computing device 202 and/or computing device 212 may be programmed with one or more of modules 102. Additionally or alternatively, server 206 may be programmed with one or more of modules 102.

In one embodiment, one or more of modules 102 from FIG. 1 may, when executed by at least one processor of computing device 202, computing device 212 and/or server 206, facilitate computing device 202, computing device 212, and/or server 206 in reevaluating apparently benign behavior on computing devices. For example, and as will be described in greater detail below, one or more of modules 102 may cause computing device 202, computing device 212, and/or server 206 to reevaluating apparently benign behavior on computing devices. For example, and as will be described in greater detail below, receiving module 104 may be programmed to receive a plurality of reports 208 from a plurality of computing systems 201 that indicate that an attack 209 that targeted each of plurality of computing systems 201 reached a specific stage on each of plurality of computing systems 201.

Identification module 106 may be programmed to identify behavioral data 211 that includes, for each computing device within plurality of computing systems 201, a plurality of activities that the computing device (e.g., computing device 202 and/or computing device 212) observed before attack 209 reached the specific stage on the computing device. The plurality of activities may be of a type 216 that is relevant to detecting a prior stage of attack 209 that precedes the specific stage of attack 209. Analysis module 108 may be programmed to analyze behavioral data 211 to correlate attack 209 with activity 214 and/or activity 224 that was observed before attack 209 reached the specific stage on at least one of plurality of computing systems 201. Determination module 110 may be programmed to determine that activity 214 and/or activity 224 is suspect based at least in part on correlating attack 209 with activity 214 and/or activity 224.

Computing device 202 and/or computing device 212 generally represent any type or form of computing device capable of reading computer-executable instructions. Examples of computing device 202 and/or computing device 212 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of analyzing behavioral data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
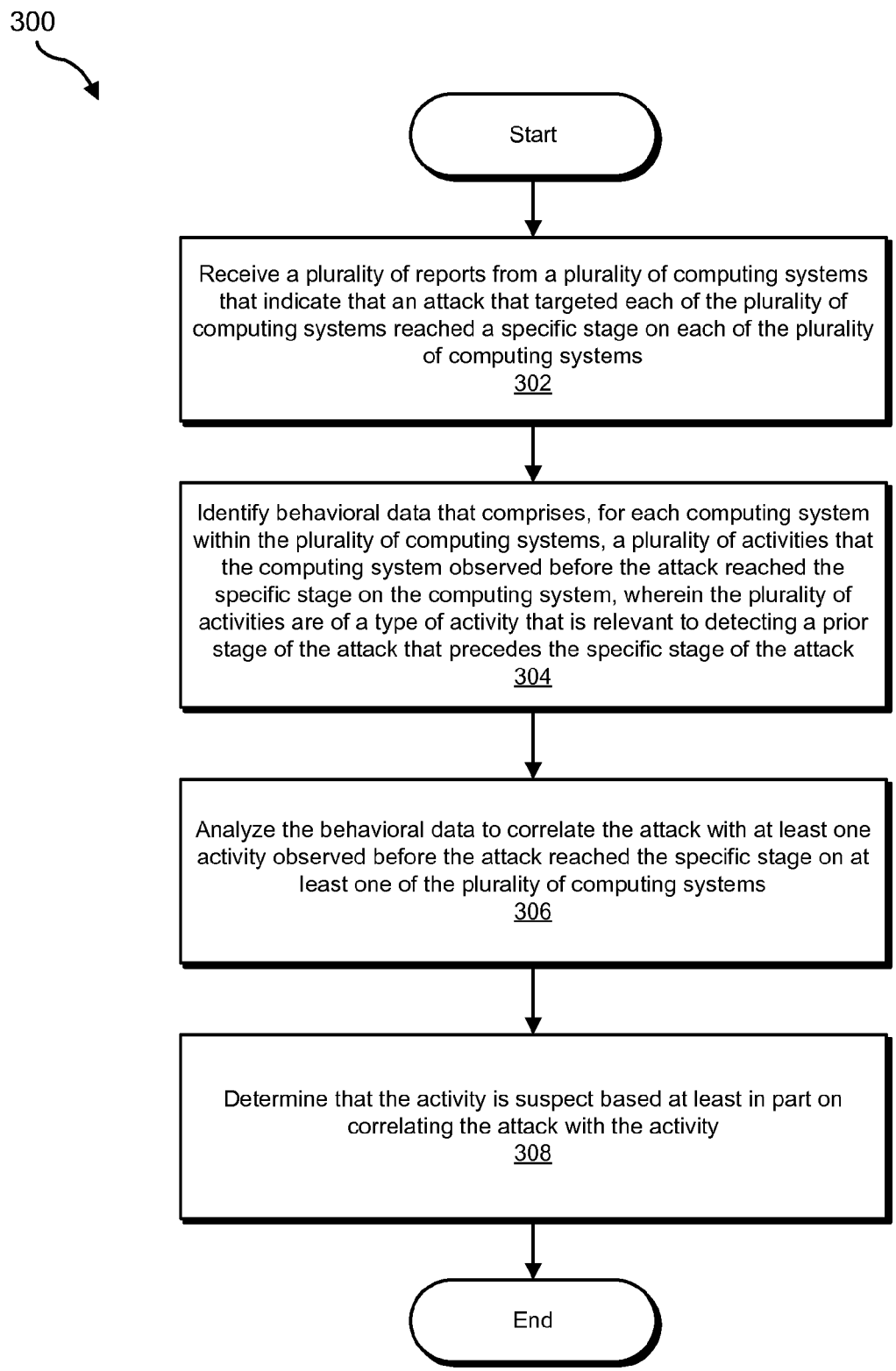
FIG. 3 is a flow diagram of an exemplary method for reevaluating apparently benign behavior on computing devices.

FIG. 3 is a flow diagram of an exemplary computer-implemented method 300 for reevaluating apparently benign behavior on computing devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive a plurality of reports from a plurality of computing systems that indicate that an attack that targeted each of the plurality of computing systems reached a specific stage on each of the plurality of computing systems. For example, at step 302 receiving module 104 may, as part of server 206 in FIG. 2, receive plurality of reports 208 from plurality of computing systems 201 that indicate that attack 209 that targeted each of plurality of computing systems 201 reached a specific stage on each of plurality of computing systems 201.

Receiving module 104 may receive reports pertaining to any or all stages of the attack. The term "stage," as used herein, generally refers to an activity performed by the attack that may be detected by a specific type of security system and/or set of security systems. For example, an attack at the "browser exploit" stage may be detected by a browser security plug-in, while an attack at the "download malicious file" stage may be detected by an anti-virus software. Certain stages of the attack may be logically constrained to occur in a certain order. For example, the first instance of the "download malicious file" stage of the attack may logically precede the "infect legitimate process" stage of the attack. In this example, after the legitimate process is infected, more malicious files may be downloaded; however, the legitimate process cannot be infected until after at least one malicious file download has occurred.

Receiving module 104 may receive reports from the same security system or from different security systems. Reports may include information about the attack itself, activities that resulted from the attack, and/or activities that indicate that an attack may have taken place.

For example, receiving module 104 may receive reports from several computing systems on a network that indicate that each of the computing systems is causing suspicious network activity that may be initiated by malware. In one example, receiving module 104 may receive reports from three personal computers on an intranet indicating that all three computers are infected with a virus that is causing the computers to send spam emails. In this example, the reports may originate from the anti-virus system which has detected the virus, and/or the email program which has detected suspicious outgoing mail activity.

The term "report," as used herein, may refer to any activity data sent by a computing system or plurality of computing systems to another computing system. Reports may be sent from a computing system to a server on a regular basis, and/or may be sent when triggered by a specific event and/or set of events. For example, reports may be sent every hour. In another example, reports may only be sent when suspicious activity is detected. Reports may include data about file downloads, network activity, web browsing sessions, function calls, process activity, and/or other types of activity. Examples of reports include, without limitation, log files, counters, analytics and/or stack traces.

The term "attack," as used herein, may refer to any automated and/or manual attempt to infect one or more computing systems with a piece of malware. Attacks may be launched from a variety of systems and/or devices including but not limited to servers, personal computers, botnets, and/or mobile devices. Attacks may target a specific computing system or network or a plurality of specific computing systems, and/or may opportunistically target any computing system and/or network that can be reached by the attack. Examples of attacks include, but are not limited to, advanced persistent threats, phishing scams, browser exploits, spyware, viruses, Trojans, and/or brute force attacks.

At step 304 one or more of the systems described herein may identify behavioral data that comprises, for each computing system within the plurality of computing systems, a plurality of activities that the computing system observed before the attack reached the specific stage on the computing system. The plurality of activities may be of a type of activity that is relevant to detecting a prior stage of the attack that precedes the specific stage of the attack. For example, at step 304 identification module 106 may, as part of server 206 in FIG. 2, identify behavioral data 211 that includes, for each computing system within plurality of computing systems 201, a plurality of activities that the computing system observed before attack 209 reached the specific stage on the computing system. The plurality of activities may be of type 216 that is relevant to detecting a prior stage of attack 209 that precedes the specific stage of attack 209.

Identification module 106 may identify activities observed by any number of systems on a computing device including, without limitation, logging systems, security systems and/or monitoring systems. For example, identification module 106 may identify activity data collected from many computers on a network that includes previous activities that may have been caused by the malware. In one example, identification module 106 may identify activity logs from the three infected computers that include log data about file downloads on the three computers for the past two weeks.

In some examples, a security system on at least one targeted computing system within the plurality of computing systems may have observed the activity but failed to detect the attack at the prior stage and an additional security system on the targeted computing system may have detected the attack at the specific stage. For example, an anti-virus program on a computing device may have observed the download of the malicious file but may have classified the file as benign. A firewall installed on the computing device may later have observed suspicious network activity caused by a process infected by the malicious file and may have detected the attack based on the suspicious network activity. In some embodiments, the anti-virus program may have sent information about the file download to identification module 106 at the time of the file download.

In some examples, the security system and the additional security system may be distinct systems. In one example, the security system may be a different instance of the same type of security system; for example, the security system and the additional security system may both be anti-virus programs. In this example, the security system and the additional security system may be anti-virus programs from different vendors, may be two instances of the same anti-virus program configured to run in different ways and/or on different devices, and/or may be two different versions of an anti-virus program from a single vendor. In another example, the security system may be of a different type of security system than the additional security system. For example, the security system may be an anti-virus program and the additional security system may be a firewall. In some examples, the security system and the additional security system may be of types that overlap, for example, the security system may be an anti-spyware program and the additional security system may be an anti-virus program that also scans for spyware.

In some examples, the security system may be the same as the additional security system. For example, an anti-virus program may have deemed a malicious file benign at the time of download but may observe suspicious behavior by a process infected by the malicious file. The anti-virus program may then detect the attack at that stage.

In some examples, the plurality of activities may include activities previously determined to be benign. For example, the activities may have not been determined suspicious and therefore may have been determined to be benign by default. Additionally or alternatively, the activities may have been incorrectly determined to be non-malicious. For example, a browser may have accessed a variety of Internet protocol addresses in a web browsing session and may have deemed all of the Internet protocol addresses benign. Identification module 106 may identify the Internet protocol address accesses as being a type of activity relevant to detecting a malicious website that may have hosted a malicious file that may have been downloaded at a later stage of the attack. Systems described herein, as described in greater detail below, may later determine one or more of the Internet protocol addresses that was previously deemed benign to be malicious.

In some embodiments, identification module 106 may identify the plurality of activities by identifying, for each computing system within the plurality of computing systems, activities that occurred on the computing system within a predetermined time span before the attack was detected on the computing system. In some embodiments, the predetermined time span may be based on the way reports are collected and/or stored. For example, a security server may only have enough resources to store two weeks' worth of activity data for the computing systems on a network. In this example, the predetermined time span may be two weeks.

The predetermined time span may be based on the type of attack and/or the type of activity, and/or may be the same for every type of attack and/or activity. For example, activities related to accessing Internet resources may have a predetermined time span of two weeks while activities related to creating files may have a predetermined time span of two hours. In one example, the predetermined time span may be two days if the attack is detected at a stage that includes the infection of a legitimate process, but one hour if the attack is detected at a stage that includes a browser exploit. In another example, identification module 106 may identify activities from one week prior to the detection of the attack regardless of the type of activity and/or attack.

Figure 4:
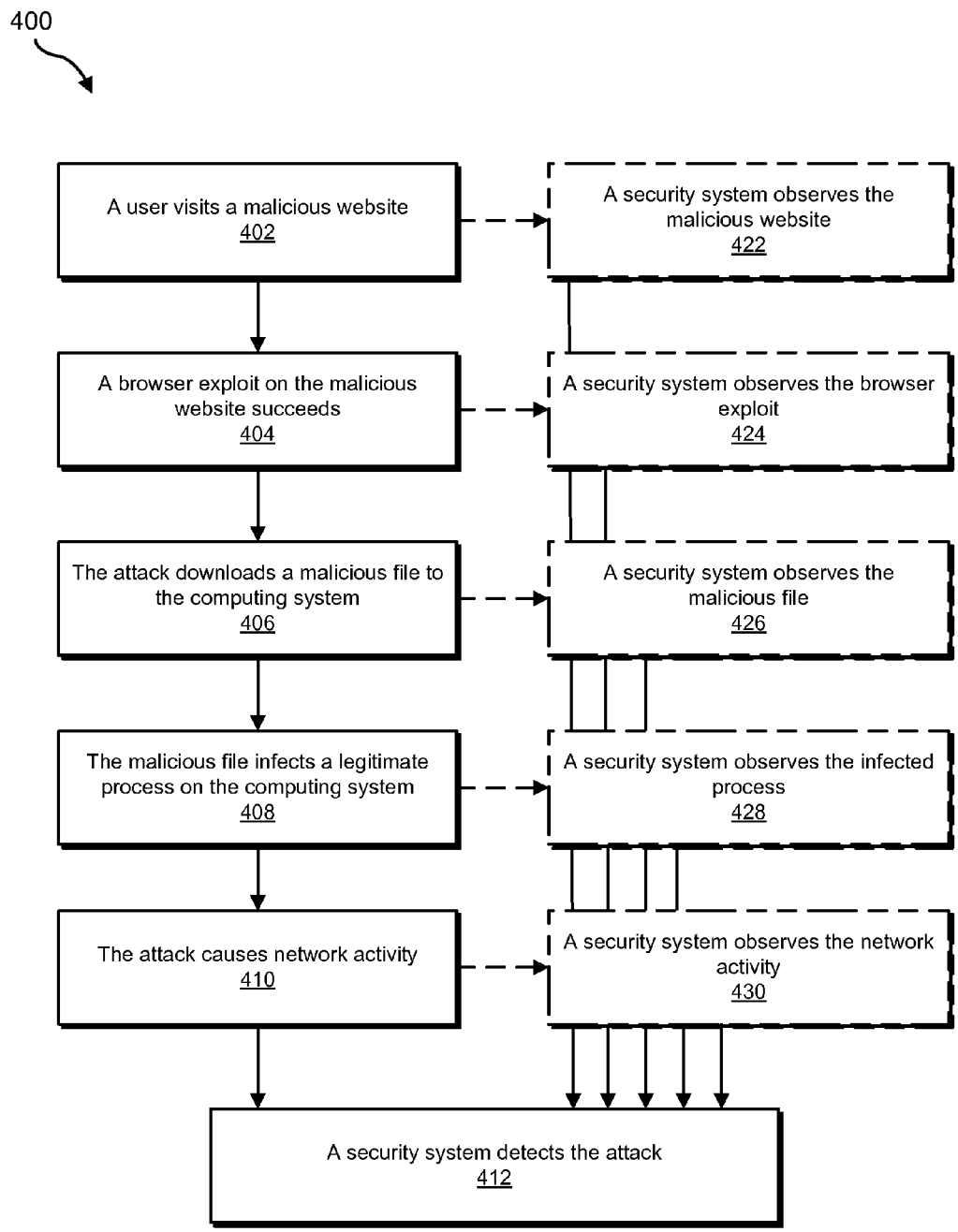
FIG. 4 is a flow diagram of an exemplary method for reevaluating apparently benign behavior on computing devices.

The prior stage of the attack and the specific stage of the attack may include any of a variety of stages. The prior stage and the specific stage may not necessarily be consecutive. FIG. 4 illustrates an exemplary set of stages through which an attack may progress. FIG. 4 is flow diagram of an exemplary method for reevaluating apparently benign behavior on computing devices. A step 402, a user may visit a malicious website. The website may be malicious because it has been created by an attacker, and/or the website may be malicious because it has been infected with malware by means of cross-site scripting and/or another attack. In some cases, the website may not be malicious but may host malicious content from third-parties such as infected advertisements and/or widgets. At step 422, a security system may observe the malicious website. A security system may detect the attack at this stage, moving immediately to step 412 in the diagram, and/or the attack may continue undetected, moving to step 404.

At step 404, a browser exploit on the malicious website may succeed. The browser exploit may take advantages of features of scripting languages, frameworks, web toolkits, document formats, and/or browser weaknesses in order to execute unauthorized code on a client system. Examples of exploited languages, document formats and/or frameworks include, without limitation, ACTIVEX, JAVA, JAVASCRIPT, PDF, and/or DOC. At step 424, a security system may observe the browser exploit. The security system may record the browser activity. The security system may detect the attack at this stage, progressing directly to step 412, or the security system may observe but not detect the attack and the attack may continue to step 406.

At step 406, the attack may download a malicious file to the computing system. The malicious file may be a virus, Trojan, spyware, and/or other type of malware. The malicious file may be disguised as a legitimate file. In some cases, a user may voluntarily download the file without being aware that the file is malicious. In some cases, the file may be automatically downloaded by the browser exploit. In some cases, the attack may download a plurality of malicious files at step 406. At step 426, a security system may observe the malicious file. The attack may be detected at this stage, and/or the attack may continue to step 408.

At step 408, the malicious file may infect a legitimate process on the computing system. The legitimate process may be a system process necessary to the operating system, or it may be a common third party process. In some cases, the malicious file may impersonate a legitimate process rather than infecting a legitimate process. At step 428, a security system may observe the infected process. As with previous steps, a security system may detect the attack at this stage, and/or the attack may continue to step 410.

At step 410, the attack may cause the network activity. At step 430, a security system may observe the network activity. In some examples, the network activity may be the attack sending information about the infected computing device to a command and control server. In some examples, the network activity may be the infected computing device acting as part of a botnet controlled by the attacker. The attack may continue performing malicious activities, and/or the attack may be detected by a security system at step 412. The security system may then use data from any or all of the prior stages of the attack, as collected in steps 422, 424, 426, 428, and/or 430, to determine a suspicious activity that is correlated with the attack.

In one example, the specific stage of the attack may include the attack causing network activity, as in step 410. In some examples, the prior stage of the attack may include the attack injecting a known legitimate process being injected with a malicious process as in step 408, the attack downloading a malicious file as in step 406, a browser exploit as in step 406, and/or a client system accessing a malicious Internet resource as in step 404. For example, a virus may attack a computing system, and the attack may be detected when the virus sends spam emails from the computing system. In this example, the security systems may have observed but not detected the virus when the virus injected a system process and began taking unusual actions including creating email documents, when the virus downloaded itself to the computing system, when a browser exploit allowed the virus access to the computing system, and/or when the browser accessed the malicious website that hosted the virus.

In some examples, the specific stage of the attack may include the attack injecting a known legitimate process with a malicious process, as in step 408. In one example, the prior stage of the attack may include the attack downloading a malicious file that includes the malicious process, as in step 406. For example, a security system may detect that a virus has injected itself into a system process. A security system may have observed but not detected the virus downloading itself onto the computing system. In this example, the security system that detected the virus may block the attack before the attack progresses to step 410 and causes network activity.

In some examples, the specific stage of the attack may include the attack downloading a malicious file, as in step 406. In one example, the prior stage of the attack may include a browser exploit, as in step 404. For example, a cross-site scripting attack may cause the browser to download a virus to the computing system. In this example, the security system that detected the download may block the attack before it progresses to step 408 and infects a legitimate process.

Additionally or alternatively, the specific stage of the attack may include a browser exploit, as in step 404. In one example, the prior stage of the attack may include a client system accessing a malicious Internet resource, as in step 402. For example, a security system may observe a browser accessing a malicious website, and may detect a cross-site scripting attack on the website. The security system may block the cross-site scripting attack before the attack can download a malicious file as in step 406.

In some examples, the prior stage of the attack may not be the stage of the attack immediately preceding the specific stage of the attack. In some cases, activity data for the intervening stage or stages may not have been collected and/or analyzed. For example, the specific stage may be step 408, in which a legitimate process is infected, and the prior stage may be step 404, in which a browser exploit succeeds. In this example there may be no record of the download of the malicious file in step 406, or the security server may not have analyzed that data. Similarly, the specific stage may be step 408 and the prior stage may be step 402, in which a user visits a malicious website. The browser exploit and the download of the malicious file may still have occurred, but may not have been recorded and/or analyzed. In one example, the specific stage may be step 406, in which a malicious file is downloaded, and the prior stage may be step 402, in which a user visits a malicious website. In this example, the browser exploit in step 404 may not have been observed or recorded.

In some examples, the intervening attack stages may have been observed and recorded, but the prior stage may have included the activity that was most quickly correlated to the attack by the security server. In these examples, systems described herein may also correlate activities associated with the intervening attack stages and/or send information about these activities to security systems.

In some embodiments, the security server may identify more than one stage as the prior stage. For example, the security server may identify both a malicious file downloaded in step 406 and the malicious website that hosted the file in step 402 as prior stages of the attack. In this example, the security server may create a signature for the malicious file and may send the signature to an anti-virus program, and may also send the uniform resource locator of the malicious website to a web browser security plug-in.

Returning to FIG. 3, at step 306 one or more of the systems described herein may analyze the behavioral data to correlate the attack with at least one activity observed before the attack reached the specific stage on at least one of the plurality of computing systems. For example, at step 306 analysis module 108 may, as part of server 206 in FIG. 2, analyze behavioral data 211 to correlate attack 209 with at least one activity 214 and/or activity 224 observed before attack 209 reached the specific stage on at least one of plurality of computing systems 201.

Analysis module 108 may analyze the activity data in any or all of a variety of ways. For example, analysis module 108 may analyze the activity data collected by the computers to correlate a specific activity within the activity data with the attack. In one example, analysis module 108 may analyze the file downloads in the log data and correlate the download of a specific file with the malware.

In some embodiments, analysis module 108 may analyze the behavioral data further by filtering out known legitimate activity that is not connected to the attack from the plurality of activities. The known legitimate activity may originate from trusted vendors and/or be recognized as normal system behavior. In some embodiments, the legitimate activity may have originated from computing systems that were not affected by the attack. The legitimate activity may have occurred outside a predetermined time span preceding the detection of the attack and/or may have occurred after the attack.

Machine learning and/or statistical analysis may be used to filter out activity that is not connected to the attack. Attributes of files, processes, Internet protocol addresses, and/or other objects and/or activities may be analyzed for similarities which may indicate they are related to each other and/or to the attack. For example, machine learning techniques including clustering based on attributes such as uniform resource locator, Internet protocol address, file size, file metadata, and/or file content may be used in order to isolate activity that is connected to the attack.

At step 308 one or more of the systems described herein may determine that the activity is suspect based at least in part on correlating the attack with the activity. For example, at step 308 determination module 110 may, as part of server 206 in FIG. 2, determine that activity 214 and/or activity 224 is suspect based at least in part on correlating attack 209 with activity 214 and/or activity 224.

Determination module 110 may determine that the activity is suspect in any or all of a variety of ways. Determination module 110 may use data about the attack and/or the activity to determine that the activity is suspect. For example, determination module 110 may determine that the specific activity may be suspect, based on the type of activity and the temporal proximity of the activity to the attack. The activity may be of a type related to the attack, and/or may have occurred shortly before the attack. In one example, determination module 110 may determine that the file download is suspicious because the same file was downloaded on all three infected computers immediately prior to the malware being detected.

In some embodiments, systems described herein may create, based on the activity, a signature that is useable by a security system to detect the attack at the prior stage. The signature may be of any type of data object that may allow a security system to identify and/or block an activity associated with an attack. Examples may include, without limitation, behavior heuristics, file hashes, Internet protocol addresses, domain names, uniform resource locators, and/or browser patches. In some examples, the signature may be a program specific data object, for example, a reputation for a file that can be consumed by a reputation server. For example, if the activity is a client system accessing a malicious website, the signature may be the uniform resource locator of the website, which a browser may add to a blacklist in order to prevent the attack from performing a browser exploit. In another example, if the activity is a malicious file download, the signature may be a hash of the malicious file that may be added to the library of a virus scanner so that the malicious file can be recognized in the future and cannot infect a legitimate process.

In some embodiments, systems described herein may send information that can be used to recognize the prior stage of the attack to at least one of the plurality of computing systems. This information may be a signature of the activity as described in greater detail above, a description of the activity, and/or a log of the activity. For example, if the prior stage of the attack was a client accessing a malicious website, systems described herein may send the Internet protocol address of the website to a browser plugin that includes a blacklist. The browser plugin may then update the blacklist with the Internet protocol address of the malicious website.

Figure 5:
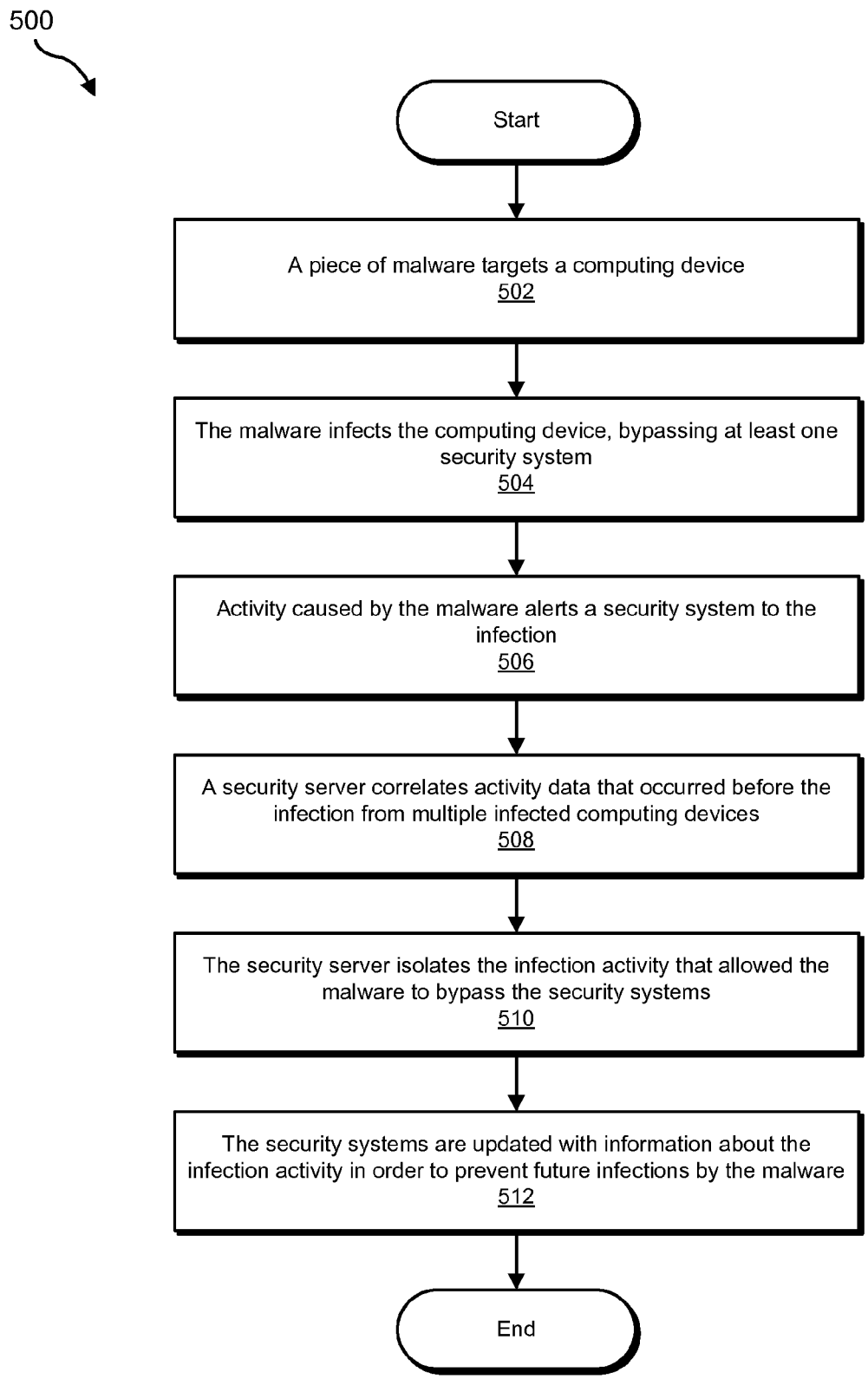
FIG. 5 is a flow diagram of an exemplary method for reevaluating apparently benign behavior on computing devices.

The attack may progress and be detected in any of a variety of ways, but many attacks may follow a similar path. FIG. 5 is a flow diagram of an exemplary computing method 500 for reevaluating apparently benign behavior on computing devices. At step 502, a piece of malware may target a computing device. The malware may include a virus, Trojan, spyware, and/or any other type of malicious program. At step 504 the malware may infect the computing device, bypassing at least one security system. For example, a virus may download itself to the computing device via a browser exploit, bypassing a browser security plugin that observed but did not detect or prevent the browser exploit and/or an anti-virus program that observed but did not detect or prevent the malicious file download. In another example, a user may open a phishing email and download a malicious file from a link therein, bypassing an email client spam filter and/or an anti-virus program.

At step 506, activity caused by the malware may alert a security system to the infection. This may be a security system that was bypassed in step 504 and/or an additional security system. For example, the virus may send information about the infected computing device to a server. The suspicious network activity caused by the virus may alert a network firewall to the infection by the virus. At step 508, a security server may correlate activity data that occurred before the infection from multiple infected computing devices. For example, the security server may gather file download data for the past week from the infected computing device and from several other computing devices that are also originating suspicious network activity.

At step 510, the security server may isolate the infection activity that allowed the malware to bypass the security systems. For example, the security server may determine that the same file was downloaded on all of the infected computing devices prior to the suspicious network activity, and that the file was not downloaded by any computing devices not exhibiting suspicious network activity. Based on this, the security server may determine that the file is malicious and/or that the website that hosted the file is malicious.

At step 512, the security systems may be updated with information about the infection activity in order to prevent future infections by the malware. For example, the browser security plugin may be updated to blacklist the uniform resource locator of the website that included the browser exploit that triggered the download of the malicious file, and/or the anti-virus program may be updated with the signature of the malicious file that caused the suspicious network activity. In this way, security systems can be automatically updated to detect and prevent new attacks in a fast and accurate manner without requiring manual intervention.

As explained above in connection with method 300 in FIG. 3, an attack may progress through several stages on any number of computing devices before being detected. Once the attack has been detected, computing devices may send reports of the attack to a security server. The security server may correlate behaviors found on the computing devices before the attack was detected in order to isolate an activity that occurred on all the computing devices prior to the discovery of the attack.

The security server may already have stored the activity data previous to the attack being detected, or it may collect the data in response to the attack being detected. Correlating the behaviors may involve filtering out known legitimate activity, activity from computing devices not affected by the attack, and/or activity that occurred outside a predetermined timespan surrounding the detection of the attack. Correlating the behaviors may be done using statistical analysis and/or machine learning techniques.

The security server may, based on correlating the behaviors, determine an activity that may be associated with a prior stage of the attack than the stage that was detected. The security server may create a signature for the activity and/or send information about the activity to other security systems. Updating the security systems in this way may allow the attack to be caught at an earlier stage and prevent malicious actions caused by later stages of the attack from affecting computing devices in the future.

Figure 6:
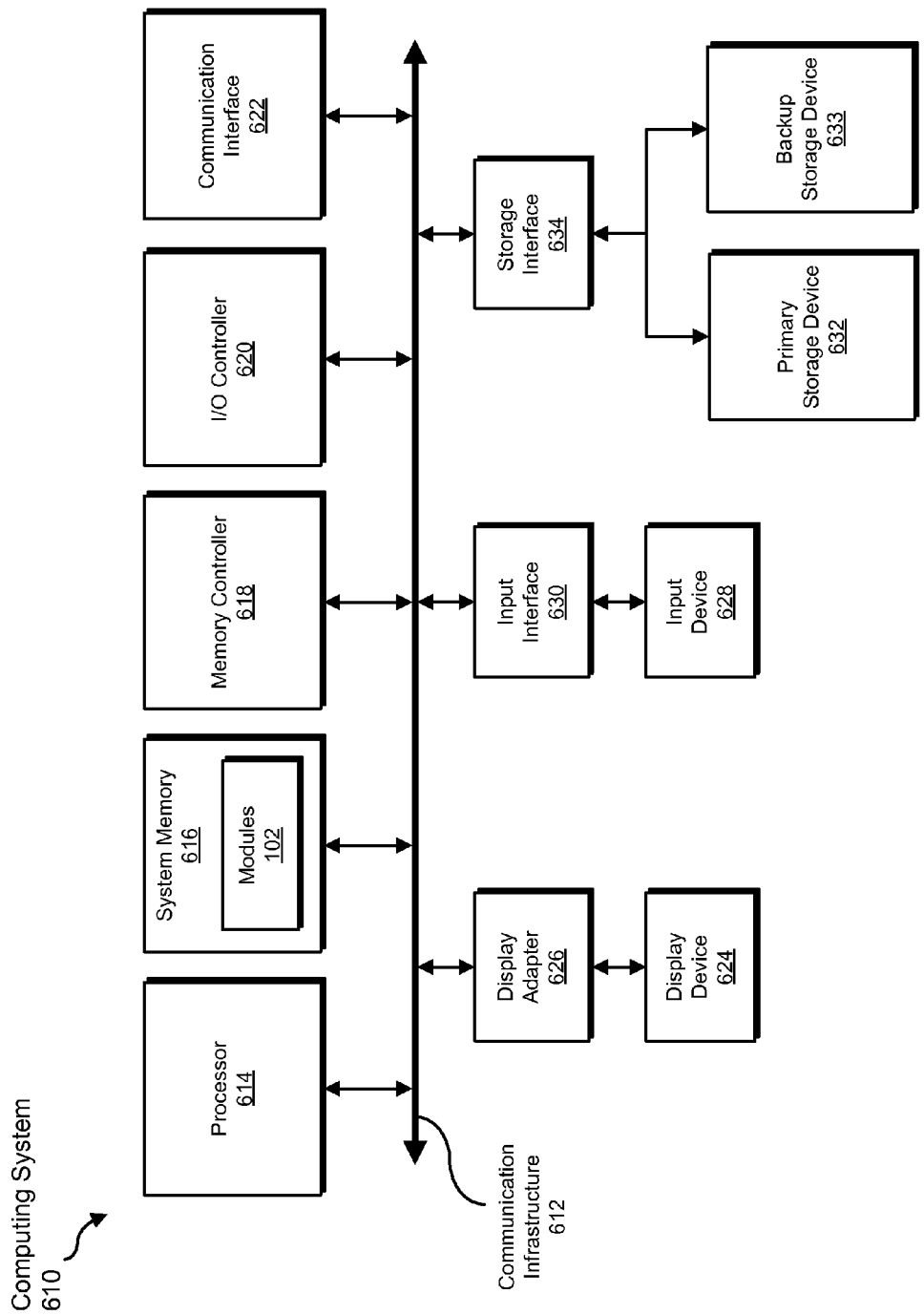
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
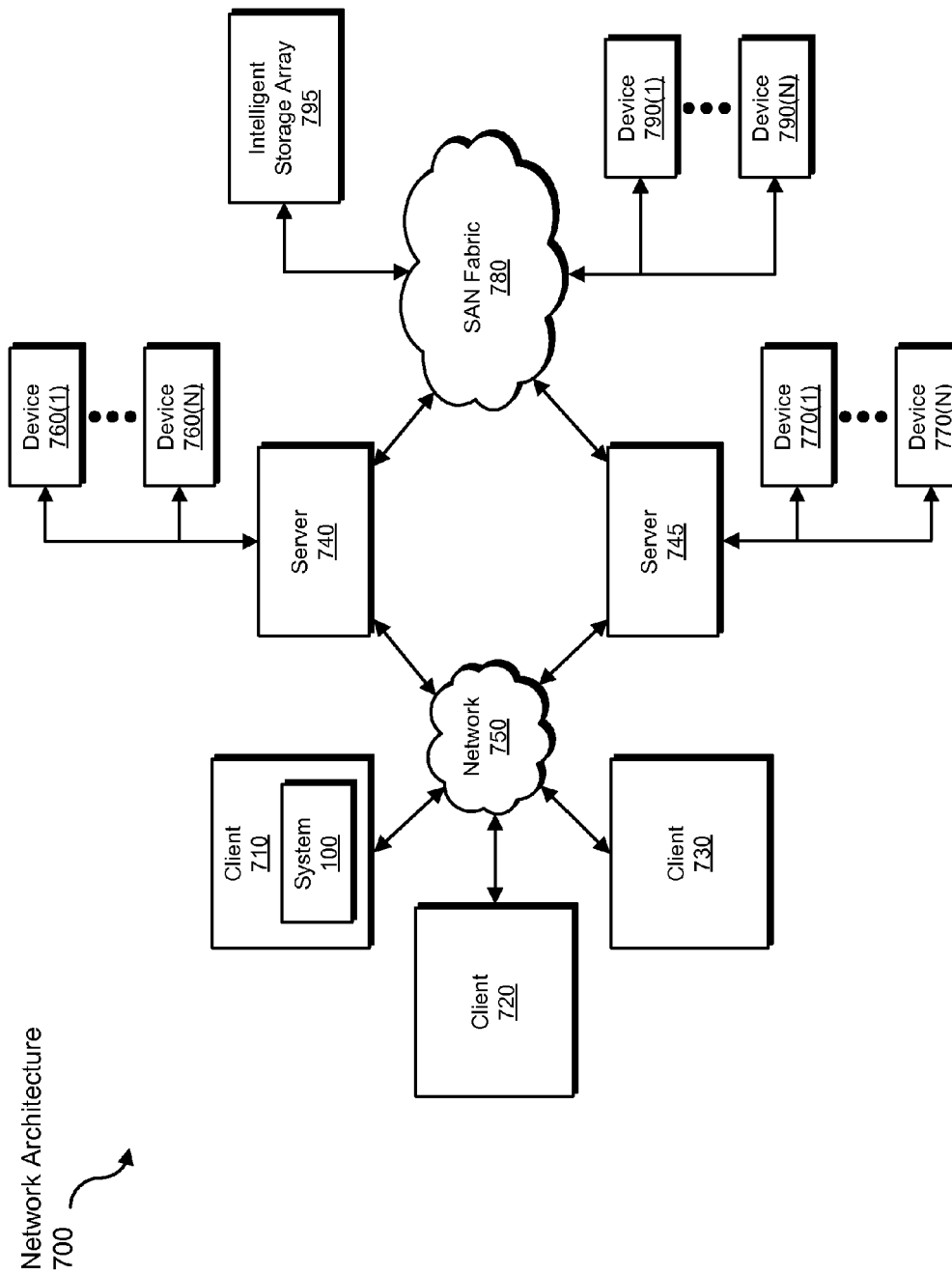
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for reevaluating apparently benign behavior on computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive behavioral data to be transformed, transform the behavioral data, output a result of the transformation to an analysis database, use the result of the transformation to create a signature for an attack, and store the result of the transformation a security database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for reevaluating apparently benign behavior on computing devices, at least a portion of the method being performed by a computing device comprising at least one processor, the method comprising:
   receiving a plurality of reports from a plurality of computing systems that indicate that an attack that targeted each of the plurality of computing systems reached a specific stage on each of the plurality of computing systems;
   identifying behavioral data that comprises, for each computing system within the plurality of computing systems, a plurality of activities that the computing system observed before the attack reached the specific stage on the computing system, wherein the plurality of activities are of a type of activity that is relevant to detecting a prior stage of the attack that precedes the specific stage of the attack;
   analyzing the behavioral data to correlate the attack with at least one activity observed before the attack reached the specific stage on at least one of the plurality of computing systems;
   determining that the activity is suspect based at least in part on correlating the attack with the activity.

2. The computer-implemented method of claim 1, wherein a security system on at least one targeted computing system within the plurality of computing systems observed the activity but failed to detect the attack at the prior stage and an additional security system on the targeted computing system detected the attack at the specific stage.

3. The computer-implemented method of claim 1, wherein the plurality of activities comprises activities previously determined to be benign.

4. The computer-implemented method of claim 1, wherein the specific stage of the attack comprises the attack causing network activity.

5. The computer-implemented method of claim 4, wherein the prior stage of the attack comprises the attack injecting a known legitimate process with a malicious process.

6. The computer-implemented method of claim 4, wherein the prior stage of the attack comprises the attack downloading a malicious file.

7. The computer-implemented method of claim 4, wherein the prior stage of the attack comprises a browser exploit.

8. The computer-implemented method of claim 4, wherein the prior stage of the attack comprises a client system accessing a malicious Internet resource.

9. The computer-implemented method of claim 1, wherein the specific stage of the attack comprises the attack injecting a known legitimate process with a malicious process.

10. The computer-implemented method of claim 9, wherein the prior stage of the attack comprises the attack downloading a malicious file that includes the malicious process.

11. The computer-implemented method of claim 1, wherein the specific stage of the attack comprises the attack downloading a malicious file.

12. The computer-implemented method of claim 11, wherein the prior stage of the attack comprises a browser exploit.

13. The computer-implemented method of claim 1, wherein the specific stage of the attack comprises a browser exploit.

14. The computer-implemented method of claim 13, wherein the prior stage of the attack comprises a client system accessing a malicious Internet resource.

15. The computer-implemented method of claim 1, further comprising creating, based on the activity, a signature that is useable by a security system to detect the attack at the prior stage.

16. The computer-implemented method of claim 1, further comprising sending information that can be used to recognize the prior stage of the attack to at least one of the plurality of computing systems.

17. The computer-implemented method of claim 1, wherein analyzing the behavioral data further comprises filtering out known legitimate activity that is not connected to the attack from the plurality of activities.

18. The computer-implemented method of claim 1, wherein identifying the plurality of activities comprises identifying, for each computing system within the plurality of computing systems, activities that occurred on the computing system within a predetermined time span before the attack was detected on the computing system.

19. A system for reevaluating apparently benign behavior on computing devices, the system comprising:

- a receiving module that receives a plurality of reports from a plurality of computing systems that indicate that an attack that targeted each of the plurality of computing systems reached a specific stage on each of the plurality of computing systems;
- an identification module that identifies behavioral data that comprises, for each computing system within the plurality of computing systems, a plurality of activities that the computing system observed before the attack reached the specific stage on the computing system, wherein the plurality of activities are of a type of activity that is relevant to detecting a prior stage of the attack that precedes the specific stage of the attack;
- an analysis module that analyzes the behavioral data to correlate the attack with at least one activity observed before the attack reached the specific stage on at least one of the plurality of computing systems;
- a determination module that determines that the activity is suspect based at least in part on correlating the attack with the activity;
- at least one processor configured to execute the receiving module, the identification module, the analysis module, and the determination module.

20. A non-transitory computer-readable-storage medium comprising one or more computer-readable instructions that, when executed by at least one processor of a computing device, cause the computing device to:

- receive a plurality of reports from a plurality of computing systems that indicate that an attack that targeted each of the plurality of computing systems reached a specific stage on each of the plurality of computing systems;
- identify behavioral data that comprises, for each computing system within the plurality of computing systems, a plurality of activities that the computing system observed before the attack reached the specific stage on the computing system, wherein the plurality of activities are of a type of activity that is relevant to detecting a prior stage of the attack that precedes the specific stage of the attack;
- analyze the behavioral data to correlate the attack with at least one activity observed before the attack reached the specific stage on at least one of the plurality of computing systems;
- determine that the activity is suspect based at least in part on correlating the attack with the activity.

\* \* \* \* \*